June 12, 1934.   J. L. MILLER   1,962,665
SHOCK ABSORBER
Filed Jan. 20, 1933

INVENTOR
JOHN L. MILLER
BY
Spencer, Hardman and Frew
ATTORNEYS

Patented June 12, 1934

1,962,665

UNITED STATES PATENT OFFICE 1,962,665

SHOCK ABSORBER

John L. Miller, Dayton, Ohio, assignor, by mesne assignments, to General Motors Corporation, Detroit, Mich., a corporation of Delaware Application January 20, 1933, Serial No. 652,586

17 Claims. (Cl. 188—88)

This invention relates to improvements in hydraulic shock absorbers.

It is among the objects of the present invention to provide an hydraulic shock absorber with valve mechanism which is adapted automatically to adjust itself in accordance with the nature of the roadway over which the vehicle is being operated. Adjusting this valve mechanism causes the shock absorber to provide an increased resistance to relative movements of the body and axles of the vehicle, thereby improving riding qualities thereof.

A further object of the present invention is to provide a shock absorber with a fluid flow control device which is automatically adjustable in response to accelerations in the velocity of the movement of the vehicle body to which said shock absorber is attached.

A still further object of the present invention is to provide an hydraulic shock absorber capable of being automatically adjusted to increase its resistance in response to accelerations in the rebound movement of the vehicle body to which the shock absorber is attached.

Furter objects and advantages of the present invention will be apparent from the following description, reference being had to the accompanying drawing in which a preferred embodiment of one form of the present invention is clearly shown.

Figure 1:
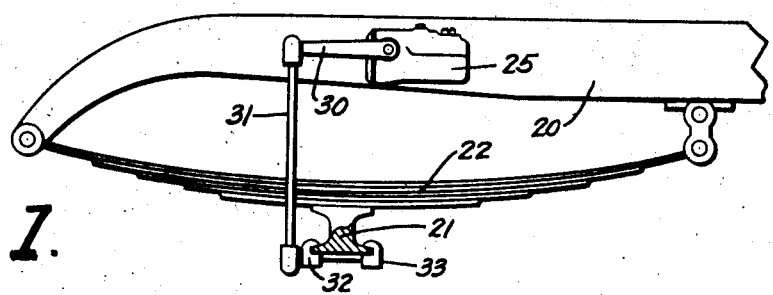
Fig. 1 is a fragmentary side view of the vehicle chassis showing a shock absorber equipped with the present invention applied thereto. The road wheels have been omitted in this view for the sake of clearness.

Referring to the drawing and particularly to Fig. 1, the frame of the vehicle is designated by the numeral 20, said frame being supported upon the vehicle axle 21 by springs 22.

The shock absorber comprising a casing 25 is attached to the frame 20 in such a position that its operating arm may be anchored to the axle 21. The shock absorber casing 25 provides a fluid reservoir 26 and a cylinder 27, the portion of the cylinder wall inside the casing having a port 28 providing communication between the inner end of the cylinder and the reservoir 26.

A rocker shaft 29 is journalled transversely of the casing, one end of this rocker shaft extending outside the casing and having the shock absorber operating arm 30 provided thereon. The free end of this arm 30 is swivelly secured to one end of a link 31, the opposite end of said link being swivelly connected to a member 32 which is secured to the axle 21 by the clamping member 33. Within the shock absorber casing 25, rocker shaft 29 has the rocker lever 34 attached thereto so that said lever will rotate with shaft 29 in response to body or axle movements. A lid 35 is attached to the open end of the casing 25 by screws 36, said lid being provided with a gasket to prevent fluid leaks.

Figure 2:
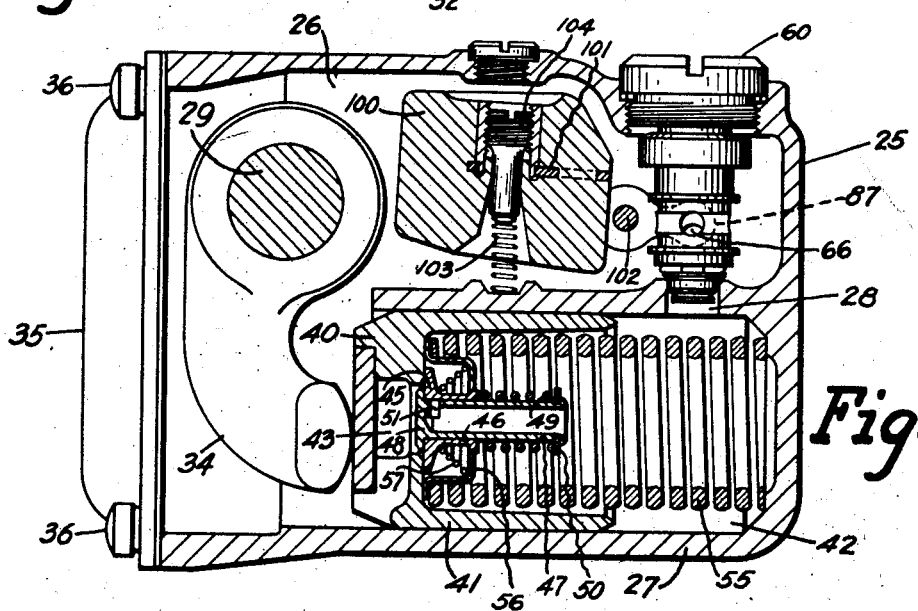
Fig. 2 is a longitudinal sectional view taken through the shock absorber, certain parts thereof being shown in elevation.

As shown in Fig. 2, the free end of rocker lever 34 lies adjacent the open end of cylinder 27 so as to be engaged by the head 40 of piston 41 which is reciprocably supported within cylinder 27 and forms the compression chamber 42 therein. The piston head 40 has a passage 43 providing communication between the compression chamber 42 and the reservoir 26. Fluid flow through the passage 43 in the piston head 40 is controlled by a valve mechanism comprising an intake valve 45, the head portion of which is yieldably urged upon the interior surface of the piston head 40 surrounding the passage 43. Valve 45 has a tubular body portion 46 which slidably supports the tubular body portion 47 of the pressure release valve 48. The pressure release valve 48 is urged into engagement with the intake valve 45 by a spring 49 interposed between the intake valve 45 and a retaining collar 50 secured at the outer end of the tubular portion 47 of valve 48. A side opening 51 in the body portion 47 of valve 48 is normally held within the confines of the tubular portion 46 of valve 45, however, in response to fluid pressure within the compression chamber 42, valve 48 is moved so that the side opening 51 thereof is uncovered by the intake valve 45 and a fluid flow is established from chamber 42 to reservoir 26 through the side opening 51 and passage 43. This flow, however, is restricted by the side opening 51. A spring 55 is interposed between the end wall of the casing 25 and a cage 56 which is urged against the inner wall of piston head 40. This cage provides an abutment for one end of a spring 57, the other end of this spring engaging intake valve 45, urging said intake valve into engagement with the interior surface of the piston head so as to close passage 43.

The fluid flow control device just described operates as follows:

In response to the road wheels of the vehicle striking an obstruction or raise in the roadbed, axle 21 is thrust upwardly toward the frame 20, compressing spring 22, thus the link 31 will move arm 30 clockwise as regards Fig. 1 and consequently rocker shaft 29 and its arm 34 will likewise rotate clockwise. This moves the free end of arm 34 away from the open end of cylinder 27 and consequently spring 55 will cause piston 41 to move outwardly from the cylinder 27 to follow this movement of the arm 34. Under these circumstances fluid from the reservoir, acting through passage 43, will move intake valve 45 from its seat against the effect of spring 57 to establish a substantially free flow of fluid past this valve 45 into the compression chamber 42.

Upon the return of the axle 21 to its normal position, which results in a separating movement between the frame 20 and axle 21, arm 30 will be rotated counter-clockwise and consequently arm 34 will be moved toward the open end of cylinder 27, thereby moving the piston 41 within the cylinder toward its closed end. Pressure will now be exerted upon the fluid within chamber 43 which pressure, when attaining a proper degree, will act through the tubular portion 47 of the pressure release valve 48 against said pressure release valve and move it from its seat on the intake valve 45 against the effect of the spring 49, thereby establishing a restricted flow of fluid through the side opening 51 which, under these conditions, will be moved without the confines of the intake valve 45.

Fluid flow control devices as described heretofore have been used in previous shock absorbers, however, the present invention contemplates the provision of a static-valve adapted to establish an initial flow of fluid from the compression chamber 42 previous to the establishment of a fluid flow by the high pressure release valve 48. The invention also contemplates the provision of an automatic mechanism adapted to render the static-valve inoperative and consequently eliminate the flow established thereby, in response to predetermined accelerations in the velocity of the movement of the shock absorber bodily and particularly vertically in one direction only. This direction is preferably the rebound movement of the vehicle body, or more specifically the upward movement of the vehicle body away from the axle 21.

This novel automatic fluid flow control device comprises a screw plug 60 adapted to be threadedly received by an aperture in the casing 25 substantially in coaxial alignment with the port 28. A cylinder 61 is interposed between the screw plug 60 and the cylinder wall in which port 28 is provided, one end of this cylinder being press-fitted into the plug 60 whereby this end of the cylinder may be said to be closed. The other or open end of the cylinder 60 fits snugly into the port 28, a rib 62 acting as an abutment which engages the annular edge surrounding port 28.

Figures 3, 4, 5:
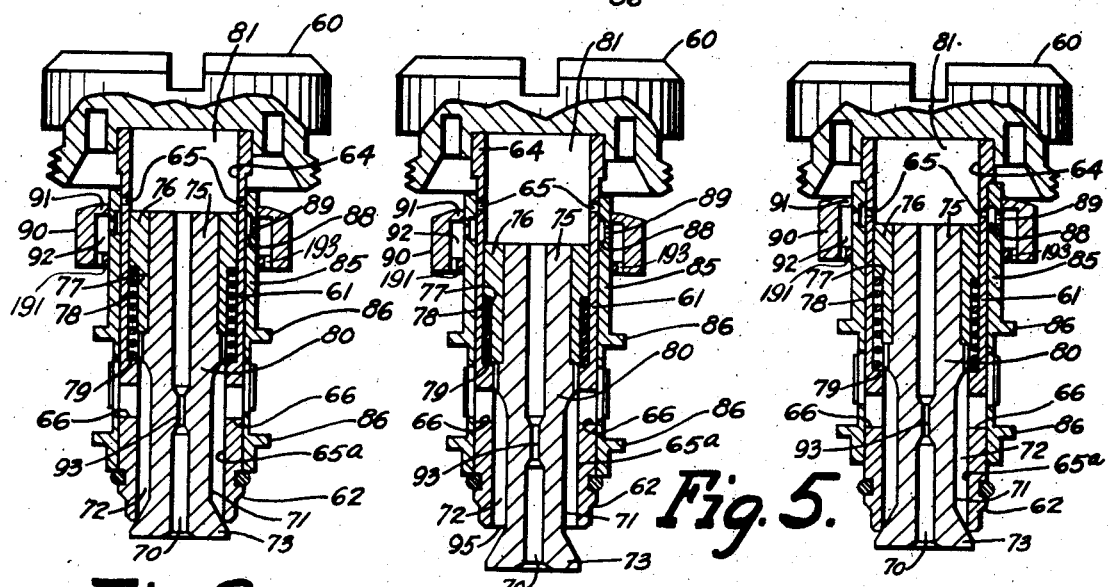
Fig. 3 is an enlarged detail sectional view of the adjustable fluid flow control device of the shock absorber, the device in this view being shown in normal position.
Fig. 4 is a veiw similar to Fig. 3, with the fluid flow control device shown in the position in which fluid flow is established.
Fig. 5 is a view similar to Figs. 3 and 4 showing the device, however, in the fluid flow restricting position.

As will be seen in Figs. 3, 4 and 5, the interior of the cylinder 61 is of two different diameters, the larger diameter portion being designated by the numeral 64, the smaller by the numeral 65a. The larger diameter portion is adjacent the closed end of cylinder 61, the smaller is at the open end of said cylinder which fits into the port 28. In the annular wall of the larger diameter portion of the cylinder 61 there are provided a plurality of openings 65. These openings are comparatively smaller than the openings 66 provided in the annular wall of the smaller diameter cylindrical portion. Within the cylinder there is provided a slidable piston valve 80 having a central, through passage 70 extending from end to end, this passage having a restricted throat portion 93. An annular groove 71 in the end of this piston valve more adjacent the portion of the sleeve 61 fitting into the port 28, provides an annular chamber 72 within the cylinder 61 with which opening 66 in said cylinder 61 communicates. The lower end of the slide valve has a frusto-conically shaped head 73, the sloping surface of which is adapted to engage the annular, inner edge of that portion of the cylinder 61 which extends into the port 28, this valve head 73 normally shutting off fluid flow between it and the cylinder 61. The upper or inner portion 75 of the slide valve has a collar 76 press-fitted thereon which fits slidably within the cylinder 61, this sleeve having an annular groove 77 at its inner end providing an annular chamber within the cylinder 61 in which a spring 78 is provided. One end of this spring engages the shoulder on the sleeve 76 formed by its annular groove 77, the other end of the spring engages the shoulder 79 formed by the two interior diameter portions of the cylinder 61. This spring normally, yieldably, urges the valve so that its head portion 73 is maintained in engagement with the end of the cylinder 61 fitting into the port 28. As will be seen in Figs. 3, 4 and 5, a chamber 81 is formed at the closed end of cylinder 61 by the sliding piston valve 80, this chamber having openings 65 leading into it at all times.

Upon the cylinder 61 there is slidably supported a sleeve valve 85, the lower end of which has spaced flanges 86 providing a saddle for receiving the forked end 87 of the inertia mass control device. This forked end 87 is shown partially dotted in Fig. 2. In the inner surface of said sleeve valve 85 there is provided an annular groove 88, said groove being in communication with the outside of the sleeve valve 85 through openings 89 in the wall of the sleeve valve 85. Normally groove 88 is not in communication with the openings 65 in the cylinder 61 as shown in Fig. 3. Upon the sleeve valve 85 there is secured a baffle collar 90, inwardly extending annular flanges 91, and 191 thereof fitting tightly upon the sleeve valve 85 so as to secure it immovably thereon and forming an annular chamber 92 about the sleeve valve 85 which constantly communicates with openings 89. A plurality of holes 193 in the lower flange 191 of the collar 90 provides outlets for chamber 92. The annular chamber 92 and its smaller outlets provided by the baffle collar 90 about sleeve valve 85 tends to reduce whistling and hissing noises usually caused by the ejection of fluid under pressure from a small opening, inasmuch as chamber 92 acts as an expansion chamber for the fluid being ejected under pressure from opening 89, opening 193 provides an exit for the fluid from said chamber 92. Any suitable restriction designated by the numeral 93 may be provided in the passage 70, this restriction varying of course in accordance with the degree of control desired.

This portion of the invention acts in the following manner:

In response to the rebounding or expanding movement of springs 22, which, as has been mentioned heretofore, results in the downward thrust of spring 22 relative to the frame 20, piston 41 will be moved inwardly within the cylinder 27 to exert a pressure upon the fluid within the chamber 42. This fluid pressure is transmitted against the valve head 73, assisting spring 78 in urging it against the lower end of the cylinder 61. The fluid pressure is also directed through the passage 70 into the chamber 81 and, due to the fact that the area of the piston-valve 80 which forms one wall of this chamber is greater than the area of the valve head portion 73, valve 80 will be moved by the differential fluid pressure against the effect of spring 78 and against the effect of the fluid pressure acting on the valve 73, into the position in which it is shown in Fig. 4, thus moving the valve head portion 73 out of engagement with the end of the cylinder 61, thereby establishing a fluid flow from port 28 into the annular chamber 72 from where it may exit through passages 66 into the reservoir 26. If the orifice 95, presented by the moving of valve head 73 from cylinder 61, is not sufficient properly to relieve the pressure in chamber 42, then valve 48 will be moved from its seat to establish another flow through the piston passages 43 into the reservoir. This fluid flow control as just described will obtain as long as the sleeve valve 85 is maintained in its normal position by the inertia control mass 100, which will now be described.

Weight 100 has a bracket 101 secured thereto which is pivoted on a pin 102 carried in the casing 25. A forked extension 87 of bracket 101 fits into the saddle provided by flanges 86 on the slide valve 85 whereby said valve is operatively connected to the inertia weight or control mass. A spring 103 interposed between an adjustment screw 104 on the weight and the wall of cylinder 27 maintains the weight in proper balanced position whereby the sleeve valve 85 is held in normal position in which it maintains openings 65 completely closed, thus making chamber 81 a completely closed chamber in which fluid pressure may be established to move the piston-valve 80 to fluid flow establishing position as described with regards to Fig. 4.

Compression movement of the spring 22 will tend to urge the vehicle body carrying frame 20 upwardly. When the springs have reached the limit of their compression caused by the respective obstruction being met, they will return to normal load position. However the vehicle, due to its inertia and, having been started upwardly, will tend to continue on its upward movement. If this upward movement of the frame which supports the body is substantially of constant velocity, weight member 100 will not become effective to adjust the fluid flow control device of the shock absorber. However, if the velocity of the rebound movement of the vehicle frame upwardly is sufficiently accelerated, weight 100 will move relatively to the shock absorber casing 25 due to its inertia and thus a downward thrust of the weight will cause an upward movement of its forked end bracket 87, resulting in an upward movement of the sleeve valve 85 whereby its interior annular groove 88 is aligned with openings 65 in the cylinder 61 as shown in the Fig. 5. This permits pressure in chamber 81 to be exhausted through the openings 65, groove 88 and openings 89 in the sleeve valve 85 and consequently the pressure effect upon the inner, larger end of the piston-valve is substantially eliminated. Now the fluid pressure upon the valve head portion 73 becomes predominant and the valve 80 is quickly moved into engagement with the inner end of the cylinder 61 whereby the fluid flow between said valve head 73 and the cylinder is entirely cut off. This naturally eliminates the static valve and thus substantially all fluid flow must obtain through the pressure release valve 48. It is of course understood that a slight flow will always occur through the central passage 70 of valve 80 through chamber 81, side openings 65, groove 88 and openings 89 as long as the valve is in the position shown in Fig. 5. However, restriction 93 in passage 70 is so great and openings 65 and 89 in the cylinder and sleeve valve respectively are so small that the volume of fluid flow therethrough is substantially negligible; therefore applicant has said that practically all the fluid flow from the chamber 42 when valve 73 engages cylinder 61 must take place through the check valve 48.

It will of course be understood that as soon as the accelerations in car body movements upwardly have reached a constant velocity, weight 100 will again be returned to its normal position by spring 103 so that valves 48 and 80 may act in conjunction to provide proper control of the shock absorber resistance.

From the aforegoing it may be seen that applicant has provided a simple and compact hydraulic shock absorber, capable of being automatically adjusted to vary its resistance in accordance with the nature of the road over which the vehicle is being operated. If the road is rough and extensive car body movements result, the shock absorber is adjusted to provide greater resistance to rebound movement of the vehicle body, while on the other hand if the vehicle is being operated over a comparatively smooth highway or boulevard, the shock absorber resistance is substantially reduced due to the fact that the weight 100 will remain in its normal position in which the low pressure static valve 73 may function.

While the form of embodiment of the present invention as herein disclosed, constitutes a preferred form, it is to be understood that other forms might be adopted, all coming within the scope of the claims which follow.

What is claimed is as follows:

1. An hydraulic shock absorber having a fluid displacement chamber provided with an outlet port; a check valve normally closing said port but adapted, in response to a predetermined fluid pressure, to open said port; and an inertia mass controlled valve adapted to be operated in response to accelerations in the velocity of the movement of the shock absorber bodily, to render the fluid pressure effective to operate the check-valve to close the port.

2. An hydraulic shock absorber having a fluid displacement chamber provided with an outlet port; a check-valve normally substantially closing said port, said valve having portions of differential areas upon which fluid pressure may act to move the valve either to port opening or normal positions; and an inertia mass controlled valve normally rendering said check valve effective to fluid pressure to open the port and adapted to be moved out of normal position in response to accelerations in the velocity of vertical movement of the shock absorber bodily to render said check valve effective to fluid pressure substantially to close the port.

3. An hydraulic shock absorber having a fluid displacement chamber provided with an outlet port; a check-valve normally closing said port, said valve having portions of differential areas upon both of which fluid pressure may act to provide a differential effect to move the valve into port opening position and only upon one of said portions to move the valve into complete port closing position; and an inertia mass controlled valve adapted to be moved in response to accelerations in the velocity of shock absorber movements bodily in one direction to cause fluid pressure to be exerted on one portion only of said check-valve.

4. An hydraulic shock absorber having a fluid displacement chamber provided with an outlet port; a check-valve yieldably urged substantially to close the port and adapted to be moved by fluid pressure either to open the port or substantially to close the port; and an inertia mass controlled valve adapted, when normally closed to render said check-valve susceptible to being opened by fluid pressure, and when said inertia valve is opened, said check-valve is rendered susceptible to being closed substantially by fluid pressure.

5. An hydraulic shock absorber having a fluid displacement chamber provided with an outlet port; a check-valve yieldably urged substantially to close the port and adapted to be moved by fluid pressure either to open the port or substantially to close the port; a normally closed control-valve adapted to render said check-valve susceptible to being opened by fluid pressure; and an inertia mass connected to the control-valve and adapted to move it into open position in response to accelerations in the velocity of casing movements in one direction only, for rendering the check-valve susceptible to being moved into substantial port closing position by fluid pressure.

6. An hydraulic shock absorber having a fluid displacement chamber provided with an outlet port; a differential valve yieldably urged, normally to close said port and adapted to have fluid pressure exerted upon its opposite ends of different areas for moving the valve to open the port; and an inertia mass controlled valve adapted to be operated in response to accelerations in the velocity of the shock absorber movement bodily for rendering the pressure upon one end of the differential valve ineffective to effect the closing of said valve by pressure.

7. An hydraulic shock absorber having a fluid displacement chamber provided with an outlet port; a check-valve yieldably urged substantially to close the port, said check-valve having a duct extending from end to end thereof, the ends of the valve differing in areas, the smaller end normally substantially closing the port; a control valve normally forming a closed chamber at the larger area end of the check-valve for moving said valve to open the port in response to fluid pressure from the displacement chamber; and an inertia mass connected to the control-valve for moving it to open the closed chamber and thus render the pressure upon the smaller area end of the valve effective to move said valve substantially to close the port in response to accelerations in the movement of the shock absorber bodily in one direction.

8. An hydraulic shock absorber having a fluid displacement chamber provided with an outlet port; a cylinder having one end fitting into said port, the other end being closed, said cylinder having openings in its annular wall, a piston valve slidable within said cylinder, one end of said piston valve normally closing the end of the cylinder, but movable by fluid pressure upon the opposite end of the valve to establish a flow of fluid from the port through certain openings in the cylinder, said piston valve having a through passage connecting the port with the chamber formed at the closed end of the cylinder by the piston valve; a control valve normally closing the openings in the cylinder leading into the chamber at its closed end, but adapted to be moved to open said chamber to cause fluid pressure to operate the piston valve to terminate the fluid flow from the port; and an inertia mass connected to the control-valve for moving it to uncover the openings in the cylinder in response to accelerations in the vertical movements of the shock absorber bodily in one direction only.

9. An hydraulic shock absorber having a fluid displacement chamber provided with an outlet; a fluid flow control device normally restricting the flow of fluid through said outlet, but adapted to be actuated by fluid pressure to decrease its restriction to fluid flow; and an inertia mass controlled device adapted to render said device ineffective to be actuated out of normal position by fluid pressure.

10. An hydraulic shock absorber having a fluid displacement chamber provided with an outlet passage; a valve normally closing said passage, but adapted to be actuated by fluid pressure to open said passage; and an inertia mass controlled device for rendering the fluid pressure ineffective to actuate the valve to open said passage, but rendering it effective to actuate the valve to close said passage.

11. An hydraulic shock absorber having a fluid displacement chamber provided with an outlet; fluid flow control means yieldably urged normally to restrict the flow of fluid through said outlet; a fluid chamber adapted to receive fluid from the displacement chamber for building up a fluid pressure therein to move the said control means into a lesser fluid flow restricting position; and an inertia mass controlled device adapted to open said fluid chamber to release the fluid pressure therein in response to accelerations in the upward movement of the shock absorber.

12. An hydraulic shock absorber having a fluid displacement chamber provided with an outlet; a valve normally restricting the flow of fluid through said outlet; a spring urging said valve into normal position; a fluid chamber at one end of the valve, adapted to receive fluid under pressure from said displacement chamber to move said valve into a lesser fluid flow restricting position; and an inertia mass controlled means adapted to open said fluid chamber and prevent fluid pressure build-up therein in response to accelerations in the upward movement of the shock absorber.

13. An hydraulic shock absorber having a fluid displacement chamber provided with an outlet port; a fluid flow control device normally restricting the flow of fluid through said port, but adapted to be actuated out of normal position by fluid pressure to decrease its restriction to fluid flow; means adapted to be actuated out of normal position to render the fluid pressure effective only to urge the said device into normal position; and an inertia control mass connected to said means and adapted to actuate it out of normal position in response to accelerations in the movement of the shock absorber vertically.

14. An hydraulic shock absorber having a fluid displacement chamber provided with an outlet port; a fluid flow control device having a valve normally closing the port, but adapted to be actuated by fluid pressure to open the port and also to close the port; a member normally rendering the fluid pressure effective to actuate the valve to open the port, but adapted to be actuated to render the fluid pressure effective to actuate the valve to close the port; and an inertia control mass connected with the said member for moving it out of normal position in response to accelerations in the movement of the shock absorber vertically.

15. An hydraulic shock absorber having a fluid displacement chamber provided with an outlet port; pressure actuated means for controlling the flow of fluid through said port; a valve for controlling the fluid flow to provide fluid pressure to actuate said means, either to increase or decrease the restriction to fluid flow through said port; and an inertia control mass for actuating said valve to provide fluid pressure for actuating the said means to increase restriction to fluid flow through said port in response to accelerations in the movement of the shock absorber vertically.

16. An hydraulic shock absorber comprising, in combination, a casing providing a fluid reservoir and a cylinder; a piston in said cylinder forming a fluid displacement chamber therein; a tubular member having openings providing communication between the displacement chamber and reservoir; a control valve in said tubular member normally shutting off communication between the chamber and reservoir through certain of the openings in the tubular member and having provisions for maintaining constant communication between said chamber and the other openings in the tubular member; a valve normally closing said other openings in the tubular member; and an inertia control mass connected with said last mentioned valve and adapted to actuate it to open said other openings in the tubular member in response to accelerations in the movement of the casing vertically.

17. An hydraulic shock absorber comprising, in combination, a casing providing a fluid reservoir and a cylinder; a piston in said cylinder forming a fluid displacement chamber therein; a tubular member having openings adjacent opposite ends thereof, said openings being larger at one end than at the other end of said member, providing communication between the displacement chamber and the reservoir; a plunger valve in said tubular member, said valve having a longitudinal passage providing constant communication between the displacement chamber and the smaller openings in the tubular member; a spring normally urging the plunger valve to shut off the said chamber from the larger openings in the tubular member; a valve on the tubular member normally closing the smaller openings therein; and an inertia control mass for actuating said valve to open the smaller openings in the tubular member and complete communication therethrough between the displacement chamber and reservoir in response to accelerations in the upward movement of the casing.

JOHN L. MILLER.